US011256452B2

(12) United States Patent
Jo

(10) Patent No.: US 11,256,452 B2
(45) Date of Patent: Feb. 22, 2022

(54) IMAGE FORMING APPARATUS ENABLE TO CHANGE OUTPUT DIRECTION OF PRINTED PAPER, ELECTRONIC APPARATUS AND METHOD FOR IMAGE FORMING THEREOF

(71) Applicant: Hewlett-Packard Development Company, L.P., Spring, TX (US)

(72) Inventor: GyeongHun Jo, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,567

(22) PCT Filed: Oct. 17, 2018

(86) PCT No.: PCT/KR2018/012268
§ 371 (c)(1),
(2) Date: Oct. 29, 2020

(87) PCT Pub. No.: WO2019/235696
PCT Pub. Date: Dec. 12, 2019

(65) Prior Publication Data
US 2021/0089250 A1 Mar. 25, 2021

(30) Foreign Application Priority Data
Jun. 4, 2018 (KR) .................. 10-2018-0064309

(51) Int. Cl.
*G06F 3/12* (2006.01)
*H04N 1/387* (2006.01)

(52) U.S. Cl.
CPC .......... *G06F 3/1208* (2013.01); *G06F 3/1285* (2013.01); *H04N 1/3877* (2013.01)

(58) Field of Classification Search
CPC combination set(s) only.
See application file for complete search history.

(56) References Cited

U.S. PATENT DOCUMENTS

| 6,278,524 B1 | 8/2001 | Kujirai et al. |
| 2003/0227639 A1 * | 12/2003 | Ferlitsch ............... G06F 3/1284 358/1.13 |
| 2006/0192796 A1 | 8/2006 | Toda |
| 2006/0221358 A1 | 10/2006 | Takahashi |
| 2007/0014611 A1 | 1/2007 | Nakamura et al. |
| 2008/0043283 A1 | 2/2008 | Takeda |

(Continued)

FOREIGN PATENT DOCUMENTS

| CN | 101131631 A | 2/2008 |
| JP | 7-319856 A | 12/1995 |

(Continued)

*Primary Examiner* — Helen Zong
(74) *Attorney, Agent, or Firm* — Jefferson IP Law, LLP

(57) ABSTRACT

An image forming apparatus and method for rotating a generated print image are provided. The image forming apparatus includes a print engine to form an image on a printing paper and a processor to generate a print image corresponding to print data, rotate the generated print image so that the generated print image corresponds to a user setting orientation if a default output orientation of the image forming apparatus is different from the user setting orientation, and control the print engine to print the rotated print image.

20 Claims, 8 Drawing Sheets

100

(56) References Cited

U.S. PATENT DOCUMENTS

| | | | |
|---|---|---|---|
| 2012/0206762 A1* | 8/2012 | Minagawa | G06F 3/1204 358/1.15 |
| 2012/0218589 A1* | 8/2012 | Watanabe | H04N 1/32438 358/1.15 |
| 2015/0109642 A1 | 4/2015 | Gabe | |
| 2016/0006891 A1 | 1/2016 | Hattori | |
| 2017/0223225 A1* | 8/2017 | Kaneda | H04N 1/2323 |
| 2019/0294386 A1* | 9/2019 | Iwamoto | G06F 3/1204 |
| 2019/0361600 A1* | 11/2019 | Matsuda | G06F 3/0488 |

FOREIGN PATENT DOCUMENTS

| | | |
|---|---|---|
| JP | 9-146728 A | 6/1997 |
| JP | 11-58853 A | 3/1999 |
| JP | 2013-121680 A | 6/2013 |
| KR | 10-2008-0021263 A | 3/2008 |

* cited by examiner

[Fig. 1]
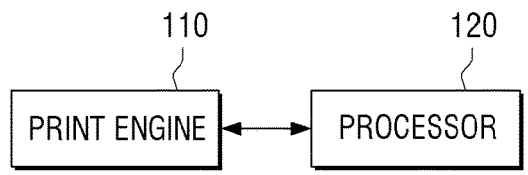
[Fig. 2]
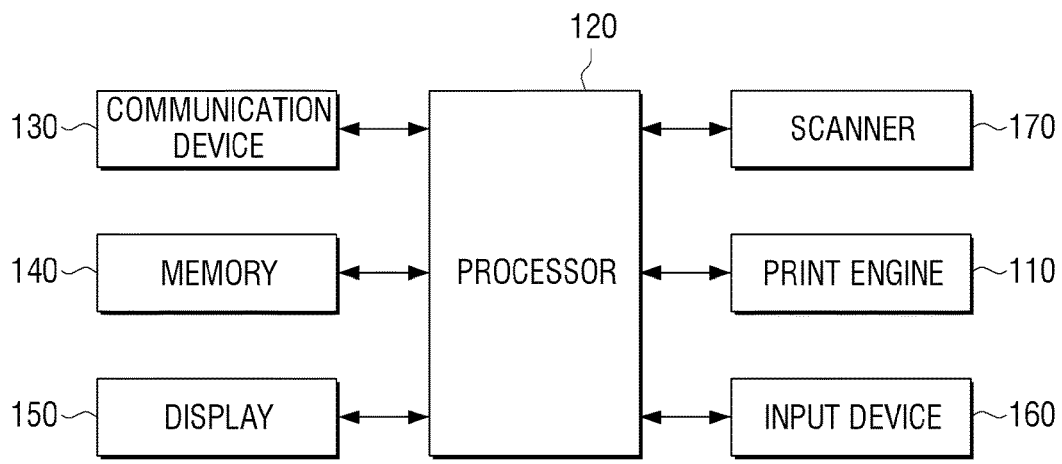
[Fig. 3]
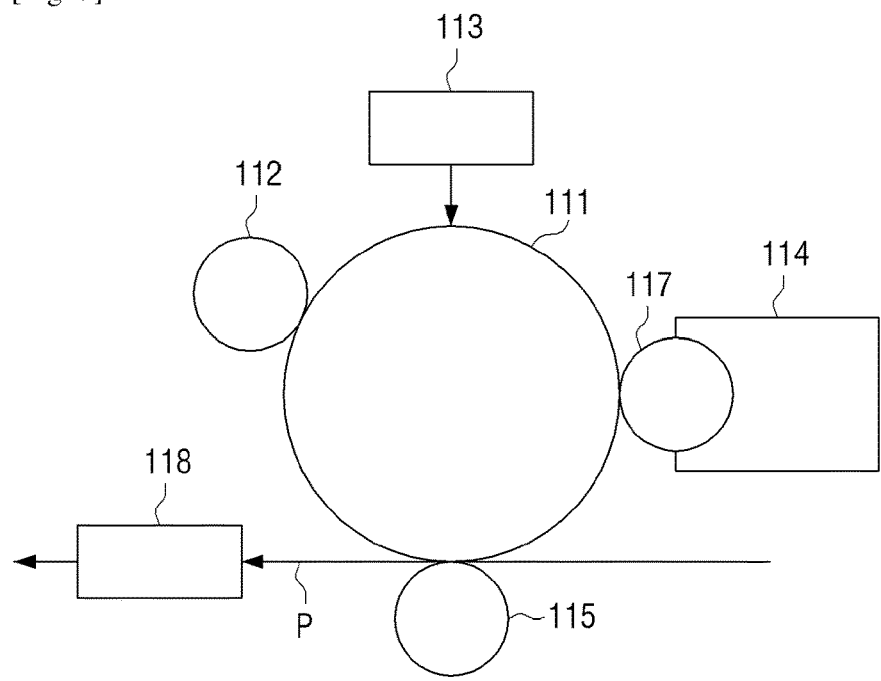

[Fig. 4]
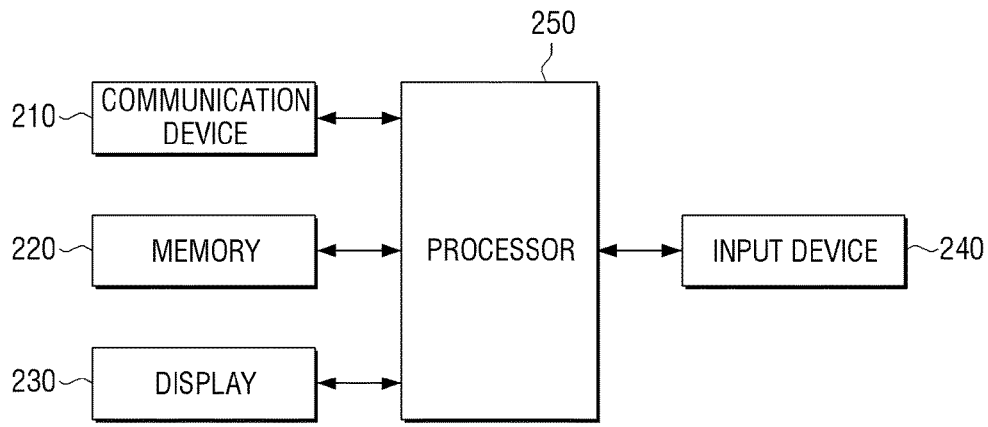
[Fig. 5]
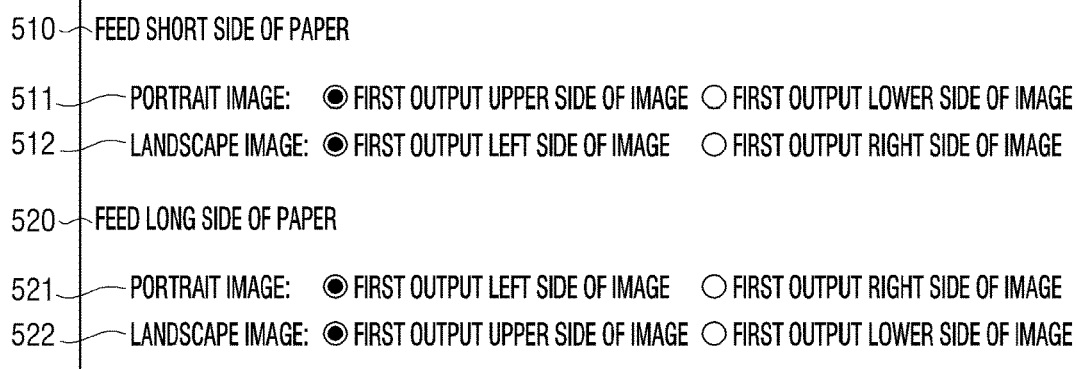
[Fig. 6]
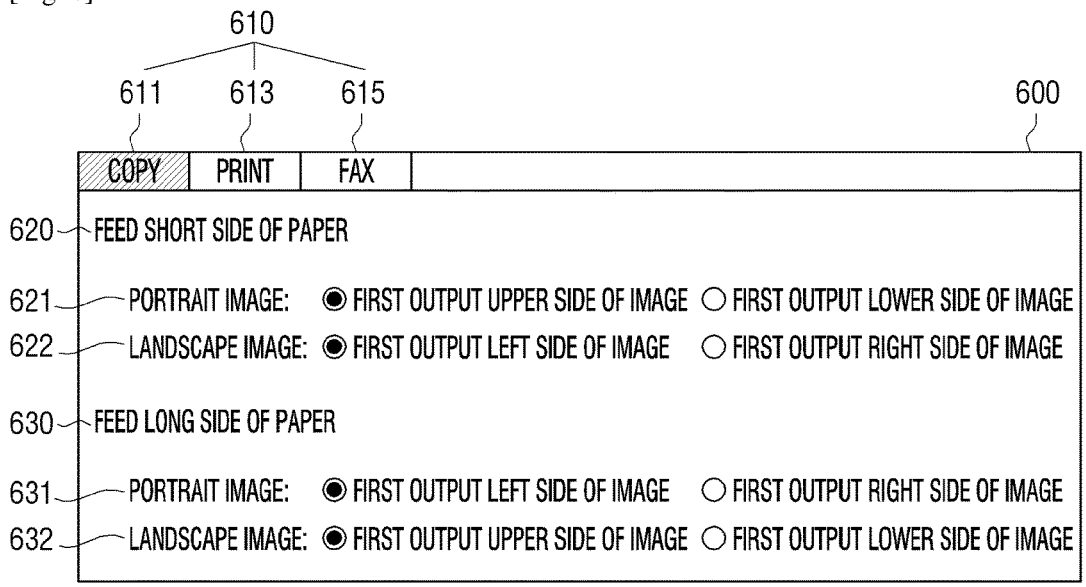

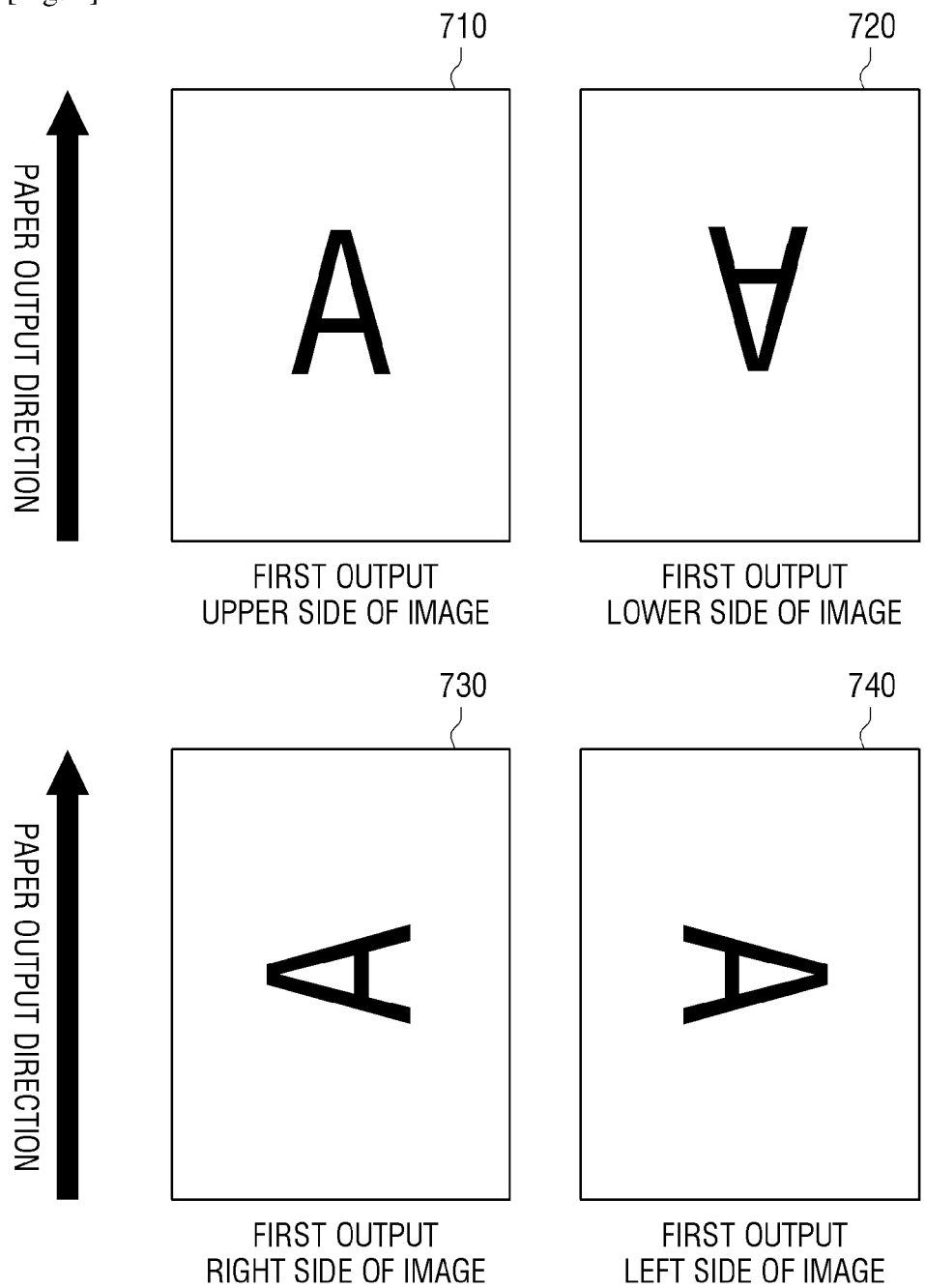

[Fig. 8]
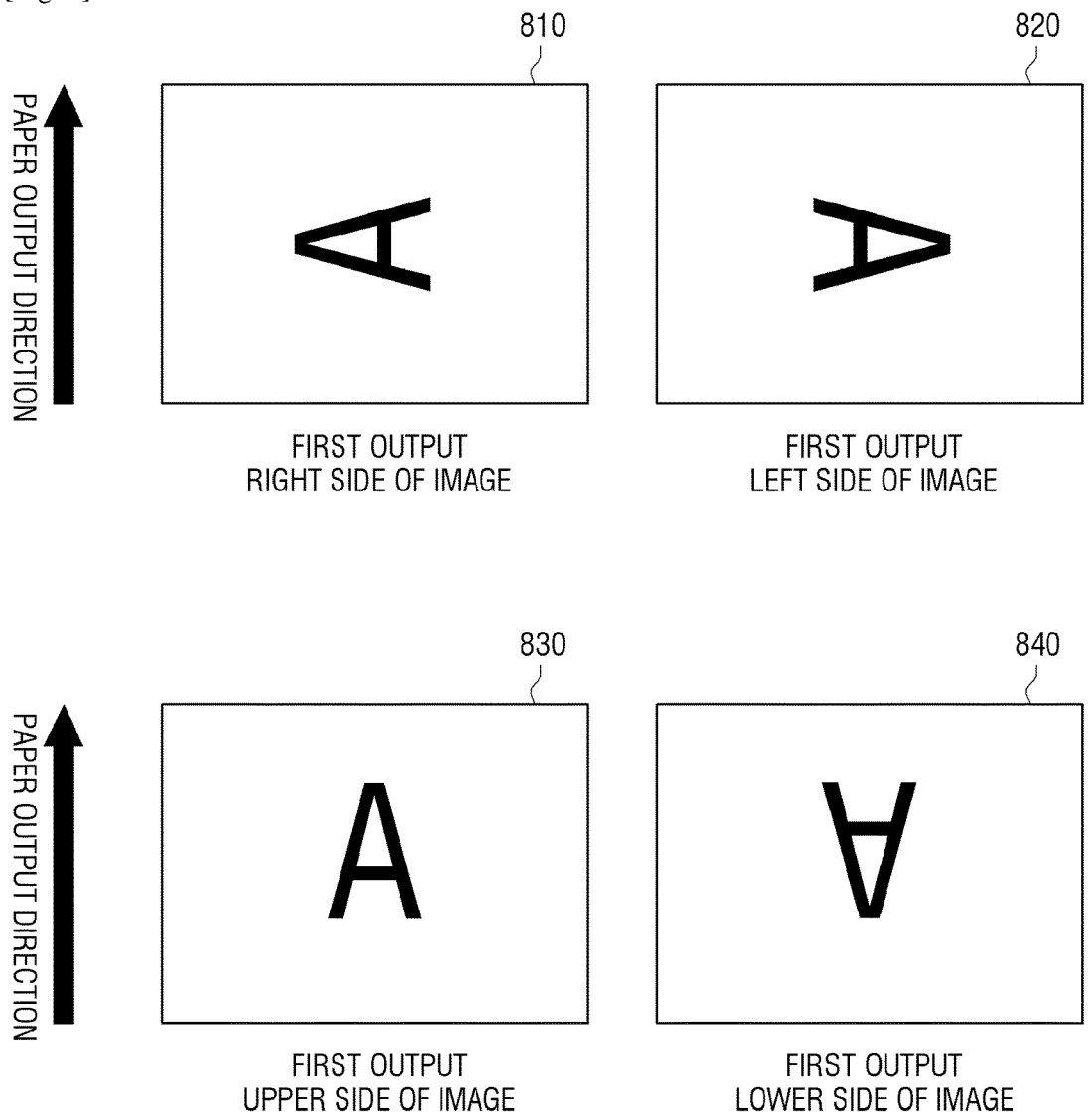
[Fig. 9]
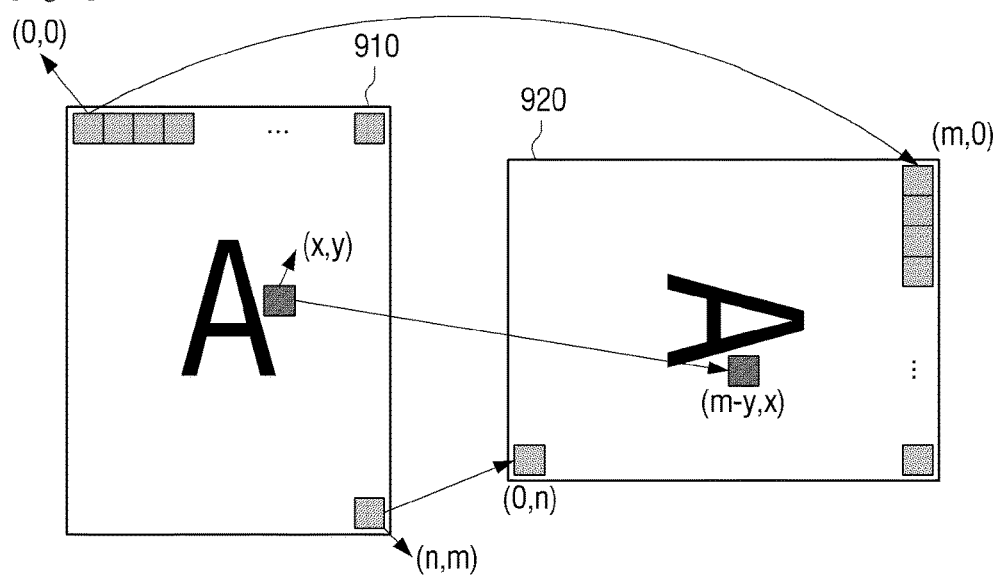

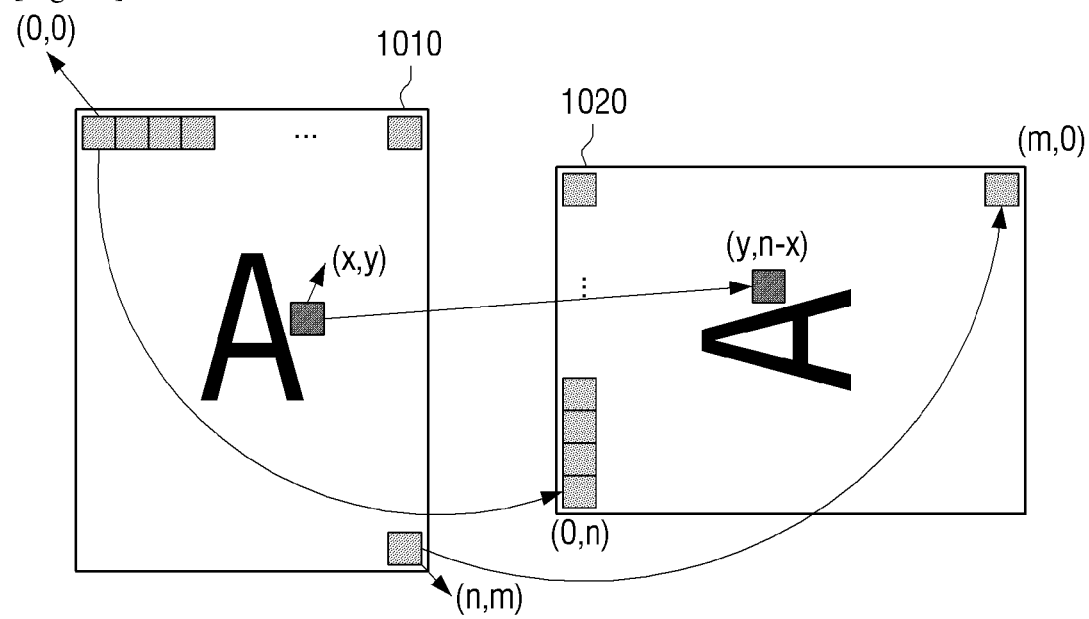
[Fig. 10]
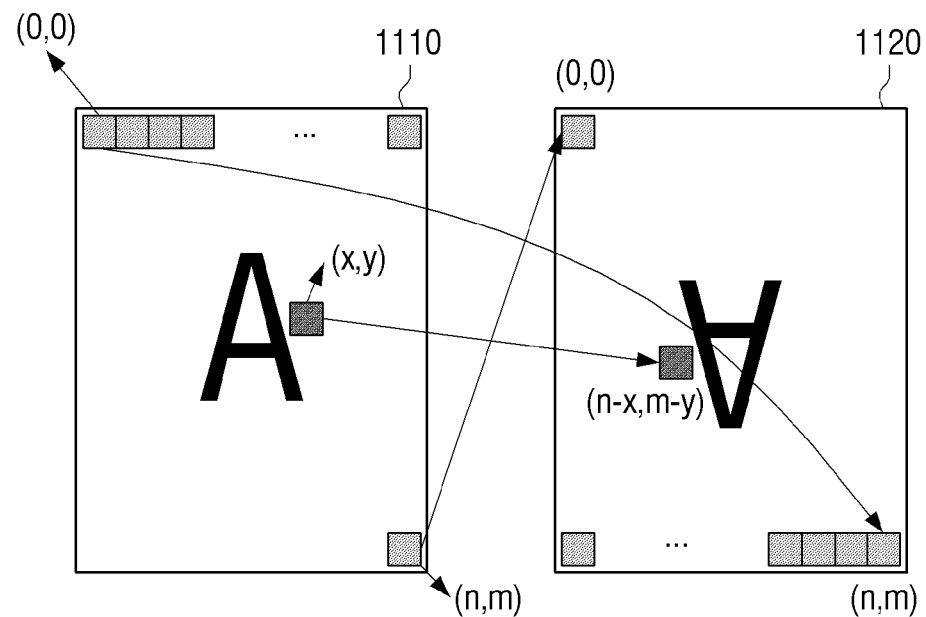
[Fig. 11]

[Fig. 12]
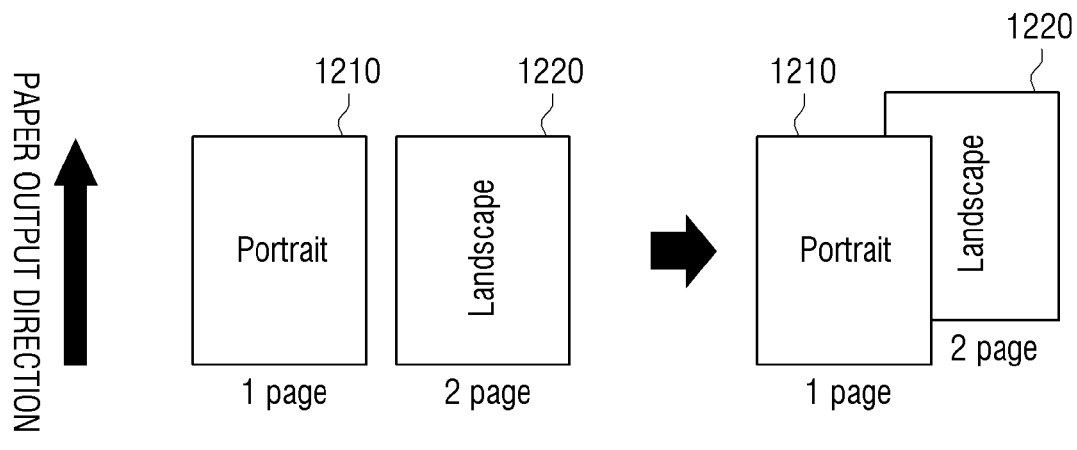
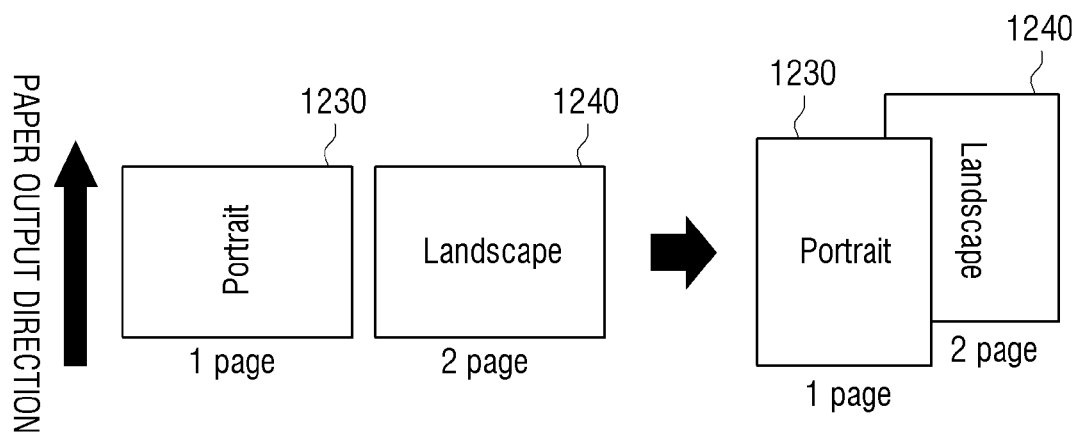

[Fig. 13]
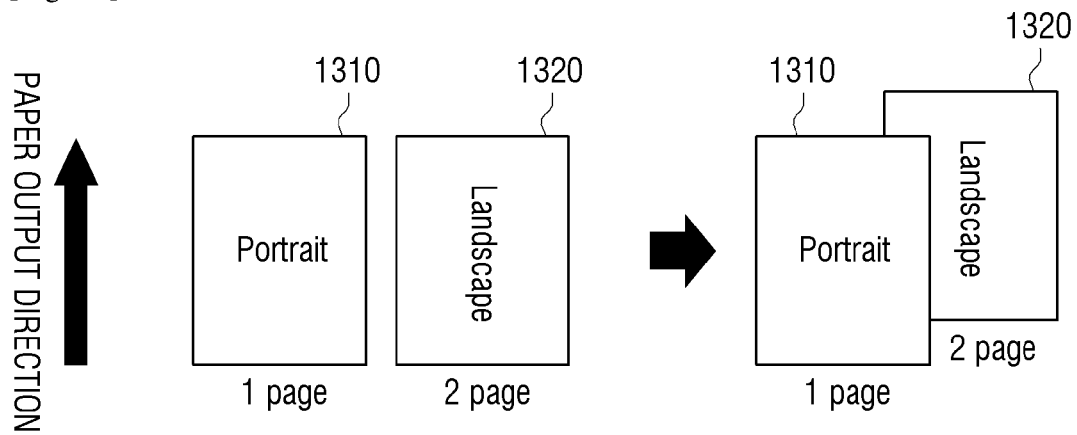
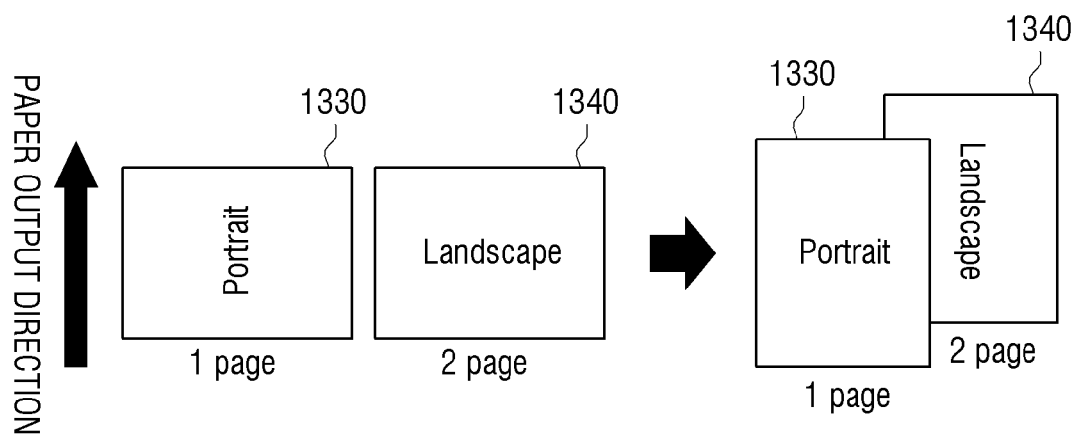
[Fig. 14]
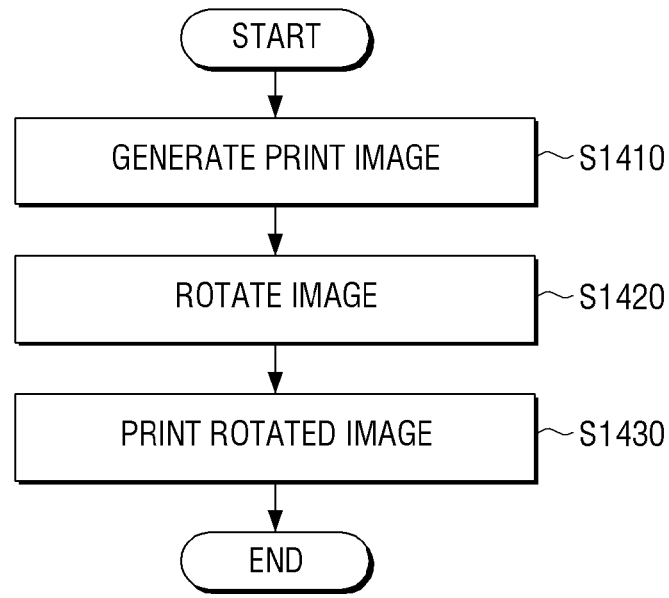

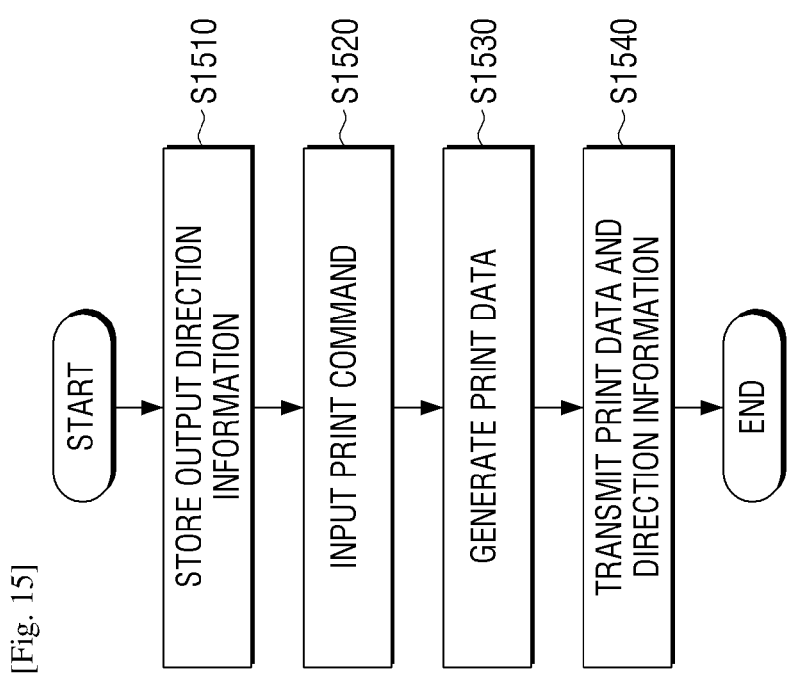

IMAGE FORMING APPARATUS ENABLE TO CHANGE OUTPUT DIRECTION OF PRINTED PAPER, ELECTRONIC APPARATUS AND METHOD FOR IMAGE FORMING THEREOF

BACKGROUND ART

With the advancement of electronic technology, various types of electronic devices have been developed. In particular, as the spread of computers has been popularized, the penetration rate of computer peripheral devices has been improved. A computer peripheral device refers to a device for heightening a utility of a computer. As an example, there may be an image forming apparatus, such as a printer, a scanner, a copier, and a multi-function printer.

The image forming apparatus outputs a printed image after performing a print job, and output orientations of printed images may be different from each other for respective manufacturers and models.

DISCLOSURE OF INVENTION

Brief Description of Drawings

The above and/or other aspects of the present disclosure will be more apparent by describing certain examples with reference to the accompanying drawings, in which:

FIG. 1 is a block diagram illustrating a brief configuration of an image forming apparatus according to an example;

FIG. 2 is a block diagram illustrating a configuration of an image forming apparatus according to an example;

FIG. 3 is a diagram illustrating a configuration of a print engine, such as the print engine of FIG. 1, according to an example;

FIG. 4 is a block diagram illustrating a configuration of an electronic device according to an example;

FIGS. 5 and 6 are diagrams illustrating a user interface window displayable in a display, such as the display of FIG. 2 or the display of FIG. 4, according to various examples;

FIG. 7 is a diagram explaining an output orientation for a user setting with respect to a portrait paper according to an example;

FIG. 8 is a diagram explaining an output orientation for a user setting with respect to a landscape paper according to an example;

FIGS. 9 to 11 are diagrams explaining image rotation types according to various examples;

FIGS. 12 and 13 are diagrams explaining an output orientation of prints in a case where orientations of print images are mixedly used according to various examples;

FIG. 14 is a flowchart explaining an image forming method in an image forming apparatus according to an example; and FIG. 15 is a flowchart explaining a print control method in an electronic device according to an example.

Throughout the drawings, it should be noted that like reference numbers are used to depict the same or similar elements, features, parts, components, and structures.

MODE FOR THE INVENTION

Hereinafter, various examples will be described with reference to the accompanying drawings. Various changes and modifications of the examples described hereinafter may be implemented. In order to explain the features of the examples more accurately, a detailed explanation of matters well-known to those of ordinary skill in the art to which the following examples of the present disclosure pertain will be omitted.

In the description, if it is described that a certain portion is connected to another portion, it means not only a direct connection but also an indirect connection through still another portion. Further, if it is described that a certain portion includes another portion, it means that the certain portion does not exclude other portions, but may further include the other portions unless specifically described to the contrary.

In the description, the term "image forming job" may mean various image-related jobs (e.g., printing, copying, scanning, and faxing), such as forming of an image or generation/storage/transmission of an image file, and "job" may mean not only an image forming job but also a series of processes required to perform an image forming job.

Further, "image forming apparatus" is an apparatus for printing print data generated from a terminal device such as a computer on a recording paper. Examples of such image forming apparatuses may be a copier, a printer, a facsimile, a scanner, and a multifunction printer (MFP) in which the functions of the copier, the printer, the facsimile, and the scanner are compositely implemented through one device. The image forming apparatus may mean any device capable of performing the image forming job, such as the copier, the printer, the scanner, the fax machine, the multifunction printer (MFP), and a display device.

Further, "hard copy" may mean an operation of outputting an image onto a printing medium, such as paper, and 'soft copy" may mean an operation of outputting an image onto a display device, such as a TV or a monitor, or to a memory.

Further, "content" may mean any kind of data becoming the subject of an image forming job, such as a photo, an image, a document file, and the like.

Further, "print data" may mean data converted into a format that can be printed by a printer. On the other hand, if the printer supports direct printing, a file itself may be print data.

Further, "user" may mean a person who performs an operation related to an image forming job using an image forming apparatus or a device connected to the image forming apparatus by wire or wirelessly. Further, "manager" may mean a person who has an authority to access all functions of an image forming apparatus and the system. The "manager" and "user" may be the same person.

FIG. 1 is a block diagram illustrating a brief configuration of an image forming apparatus according to an example.

Referring to FIG. 1, an image forming apparatus 100 may be composed of a print engine 110 and a processor 120.

The print engine 110 forms an image. For example, the print engine 110 may form an image on an image forming medium, such as a photoconductive drum, an intermediate transfer belt, a paper conveyor belt, and the like. An example of the print engine 110 will be described later with reference to FIG. 3.

The processor 120 controls respective configurations of the image forming apparatus 100. For example, if print data is received from an electronic device, the processor 120 may control the print engine 110 to print the received print data. Here, the electronic device may be a device that provides the print data, and may be a personal computer (PC), a notebook computer, a tablet PC, a smart phone, a server, and the like.

The processor 120 may be composed of a single device, such as a central processing unit (CPU), or may be composed of a plurality of devices, such as a clock generation circuit, a CPU, a graphic processor, and the like.

The processor 120 may identify the orientation of paper loaded in a load tray. Such identification may be performed using a sensor provided on the load tray, and it may be identified through a user's setting whether the loaded paper is loaded in a landscape orientation or in a portrait orientation.

Further, the processor 120 may identify whether print data is in a landscape orientation or in a portrait orientation, for example by parsing data in the print data. Accordingly, the processor 120 may primarily identify if it is necessary to rotate a print image based on the orientation of the print image and the orientation of the loaded paper.

The processor 120 may control a display to display a user interface (UI) window for setting the output orientation of prints in accordance with a user's request or in an initial setting process. Further, the processor 120 may set the output orientation selected through the displayed UI window as a user setting orientation. Such setting information may be stored in a memory.

On the other hand, in implementation, the image forming apparatus 100 having received an input for setting the output orientation of the prints from the electronic device may use the corresponding setting information received from the electronic device.

Accordingly, if a user separately sets the output orientation of the prints, the processor 120 may print the print data through reflection of the user setting orientation in a process of printing the print data.

As an example, the processor 120 may generate the print image corresponding to the received print data. More specifically, the processor 120 may parse the received print data, and may generate a rendering image based on the parsed data. Here, the rendering image may be a bitmap image or a binary image.

Further, the processor 120 may identify whether a default output orientation of the image forming apparatus coincides with the user setting orientation. Accordingly, the processor 120 may identify that the image rotation is necessary if the orientations of the currently loaded printing paper, the user setting orientations for the generated image orientation, and the default output orientations are different from each other.

For example, if the loaded paper is in a portrait orientation and the generated print image is in a portrait orientation, the default output orientation corresponds to printing of the upper side first, whereas if the user setting corresponds to printing of the lower side first, the processor 120 may identify that the user setting orientation is different from the default output orientation and thus the rotation is necessary.

If the orientation of the loaded printing paper does not coincide with the orientation of the generated image even in a case where the user setting orientation is equal to the default output orientation, the processor 120 may identify that the rotation is necessary.

If it is identified that the image rotation is necessary, the processor 120 may determine the rotation angle of the image. For example, the processor may determine the rotation angle in accordance with the orientation of the loaded printing paper, the orientation of the generated image, and the user setting orientation. Examples of a method for determining the rotation angle will be described later with reference to FIGS. 9 to 11.

If the rotation angle is determined, the processor 120 may rotate the generated print image at a determined rotation angle. For example, if the orientation of the loaded printing paper coincides with the orientation of the print image, or if the default output orientation of the image forming apparatus is different from the user setting orientation, the processor may rotate the print image at 180°.

On the other hand, in implementation, the processor 120 may generate a print image (according to circumstances, primarily rotated image) of a default setting in accordance with the orientation of the loaded printing paper and the orientation of the generated image, and may rotate the print image at 180° if the user setting orientation is different from the default output orientation.

For example, if the orientation of the loaded printing paper does not coincide with the orientation of the print image, the processor 120 may rotate the generated print image clockwise by 90° to correspond to the default output orientation, and thereafter, may not perform an additional rotation or may additionally rotate the image, which has already been rotated by 90°, by 180° in accordance with coincidence/non-coincidence of the user setting orientation and the default output orientation.

Further, the processor 120 may control the print engine 110 to print the rotated print image.

On the other hand, if the image forming apparatus 100 supports a staple function and a user activates the staple function, the processor 120 may identify whether the orientation of outputs for performing the staple function coincides with that set by the user. If the orientation of outputs for performing the staple function does not coincide with that set by the user, the processor 120 may control the display to display a message notifying that the outputs are unable to be printed in a preset orientation in order to perform the staple function.

Although a simple configuration of the image forming apparatus has been illustrated and described, various configurations may be additionally provided in implementation. Examples of such configurations will be described hereinafter with reference to FIG. 2.

FIG. 2 is a block diagram illustrating a configuration of an image forming apparatus according to an example.

Referring to FIG. 2, an image forming apparatus 100 may include a print engine 110, a processor 120, a communication device 130, a memory 140, a display 150, an input device 160, and a scanner 170.

Since examples of the print engine 110 and the processor have been described with reference to FIG. 1, duplicate description thereof will be omitted.

The communication device 130 may be connected to an electronic device and may receive print data from the electronic device. For example, the communication device 130 may connect the image forming apparatus 100 to an external device and may connect the image forming apparatus 100 to a terminal device through not only a local area network (LAN) and the Internet but also a universal serial bus (USB) port or a wireless communication (e.g., Wi-Fi 802.11a/b/g/n, NFC, Bluetooth, and the like) port. The communication device 130 may be called a transceiver.

The communication device 130 may receive information on the set orientation of the outputs from the electronic device. The set orientation of the outputs may be received together with the print data, or may be pre-received separately from the print data.

If a scan image is generated through the scanner 170, the communication device 130 may transmit the generated scan image to a preset storage device (not illustrated).

The memory 140 stores the print data therein. For example, the memory 140 may store therein the print data received through the communication device 130. Further, the memory 140 may store history information of a print job performed by the image forming apparatus 100.

Further, the memory 140 stores information on the orientation of the outputs preset by the user. Such information may be set by the user through the input device 160 of the image forming apparatus 100, or may be received through the electronic device.

Further, the information on the orientation of the outputs may be stored differently by users. For example, the orientation of the outputs by user A and the orientation of the outputs by user B may be individually stored, and in a case of usage by user A, orientation information corresponding to user A may be used, whereas in a case of usage by user B, orientation information corresponding to user B may be used.

Further, the memory 140 may temporarily store a print image corresponding to the print data generated by the processor 120 and a rotated print image.

In an example, the memory 140 may be implemented by a storage medium in the image forming apparatus 100 and an external storage medium, for example, a removable disk including a USB memory and a web server through a network.

The display 150 displays various kinds of information provided from the image forming apparatus 100. For example, the display 150 may display a user interface window for selecting various kinds of functions provided by the image forming apparatus 100.

The display 150 may be a monitor, such as a liquid crystal display (LCD), a cathode ray tube (CRT), or a light emitting diode (LED), an organic LED (OLED), and the like, and may also be implemented by a touch screen that can simultaneously perform the function of the input device 160 to be described later.

Further, the display 150 may display a control menu for performing the function of the image forming apparatus 100.

The display 150 may display a UI window for setting the output orientation of outputs. In this case, the UI window may be used for setting the output orientation for the orientation of the loaded paper and the orientation of the print image, and may be used for setting the output orientation by functions of the image forming apparatus. For example, a user setting in a copying process and a user setting in a printing process may be different from each other.

Further, the display 150 may display a menu for setting a print option related to performing a function. If a user sets a staple option and the output orientation for applying the staple option is different from the user setting orientation, the display 150 may display a message notifying that it is not possible to perform the output in a preset output orientation in accordance with the staple application.

Further, the display 150 may display information on a load orientation of the paper. For example, if the user requests double-sided printing, but the image forming apparatus 100 can perform only single-sided printing, the image forming apparatus 100 preferentially performs one-sided printing, and then performs double-sided printing on the re-supplied paper of which one-sided printing has been performed. In view of this point, the display 150 may provide information to the user on a suitable load orientation during rear-sided printing after completion of the one-sided printing.

Further, even in a case where the user uses a paper on which a specific phrase is prescribed, the display 150 may provide information to the user on the load orientation in which the phrase orientation prescribed on the paper coincides with the print orientation of the outputs.

The input device 160 may receive from the user an input of a function selection and a control command for the corresponding function. Here, the function may include printing, copying, scanning, and fax transmission. The function control command may be input through a control menu displayed on the display 150.

Further, the input device 160 may receive an input of a user command for setting the output orientation of the outputs. Further, the input device 160 may receive an input of selection of the print option for the print data. The input device 160 may be implemented by a plurality of buttons, a keyboard, a mouse, and the like, and may also be implemented by a touch screen for simultaneously performing the functions of the display 150 as described above.

The scanner 170 reads a manuscript. For example, the scanner 170 may scan a manuscript loaded on a flat-bed or an automatic document feeder (ADF) and may generate scan data. The scan data generated by the scanner 170 may be used as the above-described print data.

As described above, the image forming apparatus 100 can control the output orientation of the outputs in an orientation that is different from the default setting in accordance with the user setting. For example, a user who uses several image forming apparatuses can obtain prints in the same output orientation from a plurality of image forming apparatuses without the necessity of considering the output orientations of the respective image forming apparatuses.

Further, the image forming apparatus 100 can control the orientation of the outputs using the user setting, and even in a case of a print job using a printing paper on which a preset phrase is prescribed, the image forming apparatus 100 can perform the print job using the corresponding printing paper using the user setting.

On the other hand, referring to FIGS. 1 and 2, although it is described that a notification is displayed if the orientation according to a staple setting is different from the user setting orientation only in a case where the staple setting exists, the above-described operation can be applied even to a punching function in the same manner if the image forming apparatus provides the punching function.

FIG. 3 is a diagram illustrating a configuration of a print engine, such as the print engine of FIG. 1, according to an example.

Referring to FIG. 3, a print engine 110 may be provided with a photoconductive drum 111, a charging device 112, a laser scanning device 113, a developing device 114, a transfer device 115, and a fusing device 118.

An electrostatic latent image is formed on the photoconductive drum 111. The photoconductive drum 111 may be called a photoconductive drum or a photosensitive belt in accordance with the shape thereof.

Hereinafter, for convenience in explanation, only the configuration of the print engine 110 corresponding to one color will be described, but in implementation, the print engine 110 may include a plurality of photoconductive drums 111, a plurality of charging devices 112, a plurality of laser scanning devices 113, and a plurality of developing devices 114. In this case, the print engine 110 may further include an intermediate transfer belt for forming images formed on the plurality of photoconductive drums on one printing paper.

The charging device 112 may charge the surface of the photoconductive drum 111 with a uniform electric potential. The charging device 112 may be implemented in the form of a corona charger, charging roller, charging brush, and the like.

The laser scanning device 113 forms an electrostatic latent image on the surface of the photoconductive drum 111 by changing the surface electric potential of the photoconductive drum 111 in accordance with image information to be printed. As an example, the laser scanning device 113 may form the electrostatic latent image by irradiating the photoconductive drum 111 with light that is modulated in accordance with the image information to be printed. The laser scanning device 113 may be called an optical scanner, and LEDs may be used as light sources.

The developing device 114 accommodates a developer therein, and develops the electrostatic latent image into a visible image by supplying the developer onto the electrostatic latent image. The developing device 114 may include a development roller 117 supplying the developer onto the electrostatic latent image. For example, the developer may be supplied from the development roller 117 to the electrostatic latent image formed on the photoconductive drum 111 by a development electric field formed between the development roller 117 and the photoconductive drum 111. In an example, a replaceable implementation of the developing device 114 is called a toner cartridge.

The visible image formed on the photoconductive drum 111 is transferred to a recording medium P by the transfer device 115 or an intermediate transfer belt (not illustrated). For example, the transfer device 115 may transfer the visible image onto the recording medium using an electrostatic transfer method. The visible image is adhered to the recording medium P by electrostatic attraction.

The fusing device 118 fuses the visible image onto the recording medium P by applying heat and/or pressure to the visible image on the recording medium P. Through a series of processes as described above, the print job is completed.

On the other hand, although FIG. 3 illustrates that the print engine 110 operates as a laser type, the print engine 110 may be implemented to operate as another type, such as an inkjet type, in addition to the laser type.

FIG. 4 is a block diagram illustrating a configuration of an electronic device according to an example.

Referring to FIG. 4, an electronic device 200 may be composed of a communication device 210, a memory 220, a display 230, an input device 240, and a processor 250. Such an electronic device 200 may be not only a device, such as a PC, a notebook computer, or a server, but also a smart phone.

The communication device 210 is provided to connect the electronic device 200 to an external device, and may be connected to the image forming apparatus 100 through not only a local area network (LAN) or the Internet but also a universal serial bus (USB) port or a wireless communication (e.g., Wi-Fi 802.11a/b/g/n, NFC, Bluetooth, and the like) port. The communication device 210 may also be called a transceiver.

The communication device 210 may receive status information of the image forming apparatus 100, and may transmit print data to the image forming apparatus 100. In this case, the communication device 210 may transmit output orientation information set by the user to the image forming apparatus 100. Such output orientation information may be transmitted together with or separately from the print data at its transmission time.

Further, the communication device 210 may receive scan data from the image forming apparatus 100, and may also receive setup information (e.g., information on the default output orientation) of the image forming apparatus 100.

The memory 220 stores therein a program for driving the electronic device 200. For example, the memory 220 may store a program that is a set of various kinds of instructions required to drive the electronic device 200. Here, the program includes not only an application (or application program) for controlling the function of the image forming apparatus but also an operating program for driving the application.

The memory 220 may store files or print data generated by the processor 250 to be described later.

Further, the memory 220 may store information on the output orientation of outputs set by the user. Further, the memory 220 may store information on the default output orientation of the image forming apparatus received through the communication device 210.

The memory 220 may be implemented by a storage medium in the electronic device 200 and an external storage medium, for example, a removable disk including a USB memory and a web server through a network.

The display 230 displays a user interface window for selecting functions supported by the electronic device 200. The display 230 may be a monitor, such as LCD, CRT, LED, or OLED, and may be implemented by a touch screen that can simultaneously perform the function of the input device 240 to be described later.

Further, the display 230 displays a UI window for setting the output orientation of outputs. In this case, the displayed UI window may be for setting the output orientation for the orientation of the loaded paper and the orientation of the print image, and may be for setting the output orientation by functions of the image forming apparatus.

Further, the display 150 may display a user interface window for performing a print job. For example, the display 230 may display a user interface window for selecting a file to be printed and an image forming apparatus to perform the print job.

Further, the display may display a user interface window for setting a print option. In this case, the display 230 may display a preview image of the outputs based on the output orientation preset by the user.

On the other hand, if the user sets a staple option and the output orientation for applying the staple option is different from the user setting orientation, the display 230 may display a message notifying that the user setting orientation may differ in accordance with the staple application.

The input device 240 may receive a user control command to control the functions of the electronic device 200. In addition, the input device 240 may receive a command to perform the functions of a connectable image forming apparatus.

The input device 240 may receive an input of a user command for setting the output orientation of the outputs. Further, the input device 240 may receive an input of selection of the print option for the print data.

The input device 240 may be implemented by a plurality of buttons, a keyboard, a mouse, and the like, and may also be implemented by a touch screen for simultaneously performing the functions of the display 230 as described above.

The processor 250 controls respective configurations in the electronic device 200. The processor 250 may control the display 230 to display a user interface window for setting the output orientation of outputs if it is connected to a new image forming apparatus, or in accordance with a user's output orientation setting command. Further, if information on the output orientation of the outputs is input through the input device 240, the processor 250 may store the input information in the memory 220.

Further, if a print command is input, the processor 250 may generate print data of a document selected by the user.

In this case, the processor 250 may generate the print data in consideration of the print option set by the user.

If the print data is generated, the processor 250 may control the communication device 210 so that the generated print data and information on the pre-stored output orientation are transmitted to the image forming apparatus 100.

In this case, the processor 250 may transmit to the image forming apparatus 100 four kinds of output orientations for orientations of the paper loaded by the user and the image in all, and may transmit to the image forming apparatus 100 only information on the output orientations corresponding to the orientation of the printing paper loaded in the image forming apparatus 100 and the orientation of the current print data.

As described above, the electronic device 200 may receive in advance the output orientation of the outputs preset by the user to proceed with the print job, and thus may be provided with the outputs in the output orientation preset by the user regardless of the default setting of the image forming apparatus.

On the other hand, although it is described that the electronic device 200 individually transmits the print data and the output orientation information as illustrated in FIG. 4, the electronic device 200, in implementation, may generate the print data in consideration of the preset output orientation of the outputs.

FIGS. 5 and 6 are diagrams illustrating a user interface window displayable in a display, such as the display of FIG. 2 or the display of FIG. 4, according to various examples.

FIG. 5 illustrates a user interface window for setting the output orientation of outputs according to an example.

Referring to FIG. 5, the user interface window 500 has selection regions 511, 512, 521, and 522 for selecting the orientation of outputs for loaded paper orientations and print image orientations.

The first region 511 is a region for setting the output orientation in a case of feeding the short side of the paper 510 and in a case of printing a portrait image. If the user selects a first output of an upper side of the image in the first region 511, the outputs in the form of a first image, such as a first image 710 of FIG. 7, may be outputted. In contrast, if the user selects a first output of a lower side of the image in the first region 511, the outputs in the form of a second image, such as a second image 720 of FIG. 7, may be outputted.

The second region 512 is a region for setting the output orientation in a case of feeding the short side of the paper 510 and in a case of printing a landscape image. If the user selects a first output of a left side of the image in the second region 512, the outputs in the form of a fourth image, such as a fourth image 740 of FIG. 7, may be outputted. In contrast, if the user selects a first output of a right side of the image in the second region 512, the outputs in the form of a third image, such as a third image 730 of FIG. 7, may be outputted.

The third region 521 is a region for setting the output orientation in a case of feeding the long side of the paper 520 and in a case of printing a portrait image. If the user selects a first output of a left side of the image in the third region 521, the outputs in the form of a sixth image, such as a sixth image 820 of FIG. 8, may be outputted. In contrast, if the user selects a first output of a right side of the image in the third region 521, the outputs in the form of a fifth image, such as a fifth image 810 of FIG. 8, may be outputted.

The fourth region 522 is a region for setting the output orientation in a case of feeding the long side of the paper 520 and in a case of printing a landscape image. If the user selects a first output of an upper side of the image in the fourth region 522, the outputs in the form of a seventh image, such as a seventh image 830 of FIG. 8, may be outputted. In contrast, if the user selects a first output of a lower side of the image in the fourth region 522, the outputs in the form of an eighth image, such as an eighth image 840 of FIG. 8, may be outputted.

Referring to FIG. 6, a user interface window 600 illustrates a user interface window for setting the output orientation of outputs for functions of the image forming apparatus according to an example.

Referring to FIG. 6, the user interface window 600 has a function region 610 of the image forming apparatus and selection regions 621, 622, 631, and 632 for selecting the orientation of outputs for loaded paper orientations and print image orientations.

The function region 610 is a region for selecting a function to which a setting of the outputs is to be applied among a plurality of functions of the image forming apparatus. For example, the function region 610 may include a copy region 611, a print region 613, and a fax region 615. If the user selects the copy region 611, the paper orientation during performing of copying may be set, and if the user selects the print region 613, the paper orientation during performing of printing may be set.

Since the selection regions 621 and 622 in a case of feeding the short side of the paper 620, and 631 and 632 in a case of feeding the long side of the paper 630 perform the same functions as the selection regions 511, 512, 521, and 522 of FIG. 5, the duplicate description thereof will be omitted.

FIG. 7 is a diagram explaining an output orientation for a user setting with respect to a portrait paper (i.e., feeding the short side of paper) according to an example, and FIG. 8 is a diagram explaining an output orientation for a user setting with respect to a landscape paper (i.e., feeding the long side of paper) according to an example.

Referring to FIG. 7, if the loaded printing paper is in a portrait orientation, that is, if the short side of the paper is fed, the outputs may be outputted in four types as shown in FIG. 7.

First, if the print image is a portrait image, the upper side of the image, like the first image 710, can be first outputted, and the lower side of the image, like the second image 720, can also be first outputted.

Further, if the print image is a landscape image, the right side of the image, like the third image 730, can be first outputted, and the left side of the image, like the fourth image 740, can also be first outputted.

Referring to FIG. 8, if the loaded printing paper is in a landscape orientation, that is, if the long side of the paper is fed, the outputs may be outputted in four types as shown in FIG. 8.

First, if the print image is a portrait image, the right side of the image, like the fifth image 810, can be first outputted, and the left side of the image, like the sixth image 820, can also be first outputted.

Further, if the print image is a landscape image, the upper side of the image, like the seventh image 830, can be first outputted, and the lower side of the image, like the eighth image 840, can also be first outputted.

In the related art, for example, if a portrait image is inputted when a short side of the paper is fed, the outputs are outputted only in one of types of the first image 710 and the second image 720 in accordance with a default setting. However, such output orientations may differ for respective manufacturers and devices, and thus one device outputs the outputs in the type of the first image 710, whereas another device outputs the outputs in the type of the second image 720.

In particular, if a user using a plurality of image forming apparatuses receives the outputs in different types for respective devices, a difficulty may occur when the user uses the devices. In particular, if the orientations of the outputs are different from each other for the respective devices in a state where it is intended to perform double-sided printing or to perform a staple process, the above-described problem is further encountered.

Accordingly, an image forming apparatus according to the present disclosure can control the output orientation of the outputs differently from the orientation of the default setting.

On the other hand, if the default output orientation of the image forming apparatus is different from the user setting orientation, it is required to perform image rotation. For example, in a case of a short side of the paper, the default output orientation of the image forming apparatus with respect to a portrait image in a feeding state may be in the form of the first image 710. In this case, if the user setting in the same condition corresponds to first output of the lower side of the paper, it is required to rotate the generated image by 180°.

Hereinafter, referring to FIGS. 9 to 11, a method for rotating a print image will be described.

FIGS. 9 to 11 are diagrams explaining print image rotation types according to various examples.

Referring to FIGS. 9 and 10, an image rotation operation will be described in a case where the generated print image is a portrait image, but the loaded printing paper corresponds to long-side feeding.

For example, if the user setting is first printing of the left side of the paper, as illustrated in FIG. 9, the processor 120 may perform image processing to rotate the generated print image 910 clockwise by 90°. For example, 90° rotation may be performed by copying X, Y coordinates of each pixel constituting the print image 910 into X'=M−Y, Y'=X. Here, M is the number of portrait pixels, and N is the number of landscape pixels.

Accordingly, the rotated image 920 is rotated by 90° with respect to the generated print image 910.

In contrast, if the user setting is first printing of the right side of the paper, as illustrated in FIG. 10, the processor 120 may generate a rotated print image 1020 by rotating the generated print image 1010 counterclockwise by 90°. For example, 90° rotation counterclockwise may be performed by copying X, Y coordinates of each pixel constituting the print image 1010 into X'=Y, Y'=N−X. Here, M is the number of portrait pixels, and N is the number of landscape pixels.

Accordingly, the rotated image 1020 is rotated by 270° with respect to the generated print image 1010.

On the other hand, if the default setting of the image forming apparatus is long-side feeding and left-side first with respect to a portrait image, the operation as illustrated in FIG. 9 may be basically performed. Accordingly, the print image is preferentially rotated in accordance with the default setting of the image forming apparatus, and if the user setting coincides with the default setting, the rotated print image is printed without additional rotation, whereas if the user setting is different from the default setting, the final print image is rotated by 180°.

That is, the rotation can be performed in consideration of the user setting in the rotation operation, and the final image preferentially made in accordance with the device setting may be rotated by 180° only in a case where the user setting is different from the default setting.

Referring to FIG. 11, an image rotation operation will be described in a case where the generated print image is a portrait image, the loaded printing paper corresponds to short-side feeding, and the user setting is different from the default setting.

For example, if the default setting of the image forming apparatus is landscape feeding and first output of the upper side of the paper with respect to a portrait image, but the user setting is first output of the lower side of the paper, as illustrated in FIG. 11, the processor 120 may rotate a generated scan image by 180°.

For example, 180° rotation may be performed by copying X, Y coordinates of each pixel constituting a print image 1110 into X'=N−Y, Y'=M−Y. Here, M is the number of portrait pixels, and N is the number of landscape pixels.

Accordingly, a rotated image 1120 is rotated by 180° with respect to the generated print image 1110.

FIGS. 12 and 13 are diagrams explaining an output orientation of prints in a case where orientations of print images are mixedly used according to various examples.

FIG. 12 is a diagram explaining the output result in a case of outputting a portrait image and a landscape image by default setting of the image forming apparatus.

Referring to FIG. 12, if a portrait image 1210 and a landscape image 1220 are outputted through short-side feeding, the second outputs 1220 may be rotated counter-clockwise by 90° with respect to the first outputs 1210.

However, if the same portrait image 1230 and the same landscape image 1240 are outputted through long-side feeding, the second outputs 1240 may be rotated clockwise by 90° with respect to the first outputs 1230.

If deployment orientation between outputs is changed in accordance with the orientation of the loaded paper with respect to the same images, the user may be confused in using the image forming apparatus.

FIG. 13 is a diagram explaining an output result in a case of outputting a portrait image and a landscape image in a state where the user sets left-side orientation preference (short-side feeding) with respect to the portrait image and upper-side orientation preference (long-side feeding) with respect to the landscape image.

Referring to FIG. 13, even in a case where portrait images 1310 and 1330 and landscape images 1320 and 1340 are output through short-side feeding or long-side feeding, the second outputs 1320 and 1340 are rotated clockwise by 90° with respect to the first outputs 1310 and 1330 in the same manner.

FIG. 14 is a flowchart explaining an image forming method in an image forming apparatus according to an example.

Referring to FIG. 14, a print image corresponding to print data is first generated in operation S1410. For example, a print image corresponding to print data received from an electronic device 200 or print data generated by a scan device may be generated.

If the default output orientation of the image forming apparatus is different from the user setting orientation, the generated print image is rotated corresponding to the user setting orientation in operation S1420. For example, if the default output orientation of the image forming apparatus is different from the user setting orientation, the print image may be rotated by 180°

If the orientation of the generated print image is different from the orientation of the loaded paper, additional rotation by 180° may be performed after the print image is rotated corresponding to the paper orientation. Further, in imple- mentation, the image rotation may be performed at a time in consideration of both the difference in orientation between the print image and the loaded paper and the difference between the user setting orientation and the default output orientation.

The rotated print image is printed in operation S1430.

According to an example image forming method in an image forming apparatus, it is possible to control the output orientation of the outputs differently from the default setting in accordance with the user setting. The image forming method as illustrated in FIG. 14 can be executed by the image forming apparatus having one of configurations of FIGS. 1 and 2, and can also be executed on an image forming apparatus having another configuration.

On the other hand, the image forming method as described above may be implemented by a program and may be provided to the image forming apparatus. In particular, the program including the image forming method may be stored and provided in a non-transitory computer readable medium.

The non-transitory computer readable medium is not a medium that stores data for a short period, such as a register, a cache, or a memory, but is a medium which semi-permanently stores data and is readable by a device. For example, various applications and programs as described above may be stored and provided in the non-transitory computer readable medium, such as, a CD, a DVD, a hard disc, a Blu-ray disc, a USB, a memory card, a ROM, and the like.

FIG. 15 is a flowchart explaining a print control method in an electronic device according to an example.

Referring to FIG. 15, information on an output orientation of the outputs is inputted in operation S1510. For example, a UI window for setting the output orientation of the outputs may be displayed, and the output orientation of the outputs may be inputted through the displayed UI window. In this case, the output orientations for the loaded paper orientations and the print image orientations may be inputted.

Further, information on the input output orientation is stored in operation S1520. On the other hand, in implementation, the output orientation of the outputs are not prestored, but may be set by the user during the printing process. That is, the output orientation may be set as a print option.

Further, if a print command is inputted, print data corresponding to the input print command is generated in operation S1530. In this case, the print data may be generated in consideration of the print option set by the user.

Further, the generated print data and information on the stored output orientation are transmitted to the image forming apparatus in operation S1540.

According to a print control method in an electronic device according to examples of the present disclosure, it is possible to control the output orientation of the outputs differently from the default setting in accordance with the user setting. The print control method as illustrated in FIG. 15 can be executed by the electronic device having the configuration of FIG. 4, and can also be executed on an electronic device having another configuration.

On the other hand, the print control method as described above may be implemented by a program and may be provided to the electronic device. In particular, the program including the communication method of the electronic device may be stored and provided in a non-transitory computer readable medium.

The foregoing examples and advantages are merely exemplary and are not to be construed as limiting the present disclosure. The present teaching can be readily applied to other types of apparatuses. Also, the description of the examples of the present disclosure is intended to be illustrative, and not to limit the scope of the claims, and many alternatives, modifications, and variations will be apparent to those skilled in the art.

The invention claimed is:

1. An image forming apparatus comprising:
a print engine to form an image on a printing paper; and
a processor to:
identify an orientation of the printing paper,
generate a print image corresponding to print data and identify an orientation of the print image,
rotate the print image so that the print image corresponds to a user setting orientation based on a default output orientation of the image forming apparatus being different from the user setting orientation,
maintain the orientation of the print image so that the print image corresponds to the user setting orientation based on the default output orientation of the image forming apparatus coinciding with the user setting orientation and based on the orientation of the printing paper coinciding with the orientation of the print image, and
control the print engine to print the print image.

2. The image forming apparatus as claimed in claim 1, wherein the processor determines a rotating angle in accordance with the orientation of the printing paper and the user setting orientation, and rotates the print image at the determined rotating angle.

3. The image forming apparatus as claimed in claim 1, wherein the processor rotates the print image by 180° based on the orientation of the printing paper coinciding with the orientation of the print image and based on the default output orientation of the image forming apparatus being different from the user setting orientation, and
wherein the processor rotates the print image by 270° based on the orientation of the printing paper being different from the orientation of the print image and based on the default output orientation of the image forming apparatus being different from the user setting orientation.

4. The image forming apparatus as claimed in claim 1, further comprising a display to display thereon a user interface (UI) window for selecting an output orientation of prints,
wherein the processor sets the output orientation selected through the UI window as the user setting orientation.

5. The image forming apparatus as claimed in claim 4, wherein the UI window comprises a plurality of selection regions for selecting respective output orientations for the orientation of the printing paper and the orientation of the print image.

6. The image forming apparatus as claimed in claim 4, wherein the UI window comprises a function region for selecting a function of the image forming apparatus to which the selected output orientation is to be applied.

7. The image forming apparatus as claimed in claim 1, further comprising a display to display thereon a user interface (UI) window for selecting a print option to be applied to the print data,
wherein the processor controls the display to display a notification based on a staple option being selected through the UI window, and
wherein an output orientation for applying the staple option is different from the user setting orientation.

8. An image forming method in an image forming apparatus, the image forming method comprising:
identifying an orientation of a printing paper;

generating a print image corresponding to print data and identifying an orientation of the print image;

rotating the print image so that the print image corresponds to a user setting orientation based on a default output orientation of the image forming apparatus being different from the user setting orientation;

maintaining the orientation of the print image so that the print image corresponds to the user setting orientation based on the default output orientation of the image forming apparatus coinciding with the user setting orientation and based on the orientation of the printing paper coinciding with the orientation of the print image; and printing the print image.

9. The image forming method as claimed in claim 8, wherein the rotating comprises:

determining a rotation angle in accordance with the orientation of the printing paper and the user setting orientation; and rotating the print image at the determined rotation angle.

10. The image forming method as claimed in claim 8, wherein the rotating comprises:

rotating the print image by 180° based on the orientation of the printing paper coinciding with the orientation of the print image and based on the default output orientation of the image forming apparatus being different from the user setting orientation; and rotating the print image by 270° based on the orientation of the printing paper being different from the orientation of the print image and based on the default output orientation of the image forming apparatus being different from the user setting orientation.

11. The image forming method as claimed in claim 8, further comprising:

displaying a user interface (UI) window for selecting an output orientation of prints; and setting the output orientation selected through the UI window as the user setting orientation.

12. The image forming method as claimed in claim 11, wherein the UI window comprises a plurality of selection regions for selecting respective output orientations for the orientation of the printing paper and the orientation of the print image.

13. The image forming method as claimed in claim 11, wherein the UI window comprises a function region for selecting a function of the image forming apparatus to which the selected output orientation is to be applied.

14. The image forming method as claimed in claim 8, further comprising:

displaying a user interface (UI) window for selecting a print option to be applied to the print data; and displaying a notification based on a staple option being selected through the UI window and an output orientation for applying the staple option being different from the user setting orientation.

15. A non-transitory computer readable storage medium having instructions stored thereon to perform an image forming method in an image forming apparatus, the non-transitory computer readable storage medium comprising:

instructions to identify an orientation of a printing paper;

instructions to generate a print image corresponding to print data and identify an orientation of the print image;

instructions to rotate the print image so that the print image corresponds to a user setting orientation based on a default output orientation of the image forming apparatus being different from the user setting orientation;

instructions to maintain the orientation of the print image so that the print image corresponds to the user setting orientation based on the default output orientation of the image forming apparatus coinciding with the user setting orientation and based on the orientation of the printing paper coinciding with the orientation of the print image; and instructions to print the print image.

16. The non-transitory computer readable storage medium as claimed in claim 15, wherein the instructions to rotate the print image comprise:

instructions to determine a rotation angle in accordance with the orientation of the printing paper and the user setting orientation; and instructions to rotate the print image at the determined rotation angle.

17. The non-transitory computer readable storage medium as claimed in claim 15, wherein the instructions to rotate the print image comprise:

instructions to rotate the print image by 180° based on the orientation of the printing paper coinciding with the orientation of the print image and based on the default output orientation of the image forming apparatus being different from the user setting orientation; and instructions to rotate the print image by 270° based on the orientation of the printing paper being different from the orientation of the print image and based on the default output orientation of the image forming apparatus being different from the user setting orientation.

18. The non-transitory computer readable storage medium as claimed in claim 15, further comprising:

instructions to display a user interface (UI) window for selecting an output orientation of prints; and instructions to set the output orientation selected through the UI window as the user setting orientation.

19. The non-transitory computer readable storage medium as claimed in claim 18, wherein the UI window comprises a plurality of selection regions for selecting respective output orientations for the orientation of the printing paper and the orientation of the print image.

20. The non-transitory computer readable storage medium as claimed in claim 18, wherein the UI window comprises a function region for selecting a function of the image forming apparatus to which the selected output orientation is to be applied.

* * * * *